United States Patent [19]

Loulourgas

[11] Patent Number: 5,096,410
[45] Date of Patent: Mar. 17, 1992

[54] WATER JACKETED SPRUE BUSHING

[76] Inventor: Demetre Loulourgas, 1351 N. Arcturas Ave., Clearwater, Fla. 34625

[21] Appl. No.: 657,115

[22] Filed: Feb. 19, 1991

[51] Int. Cl.[5] .............................................. B29C 45/72
[52] U.S. Cl. ..................... 425/547; 264/328.14; 425/567; 425/569
[58] Field of Search ............... 425/547, 548, 549, 567, 425/569; 264/328.14, 328.15

[56] References Cited

U.S. PATENT DOCUMENTS

| | | | |
|---|---|---|---|
| 3,550,207 | 12/1970 | Strauss | 18/30 |
| 4,004,871 | 1/1977 | Hardy | 425/243 |
| 4,121,740 | 10/1978 | Gabrys | 222/146 H |
| 4,260,348 | 4/1981 | Graham | 425/144 |
| 4,260,359 | 4/1981 | Dannels et al. | 425/543 |
| 4,273,525 | 6/1981 | Reitan | 425/567 |
| 4,318,686 | 3/1982 | Morgan | 425/543 |
| 4,386,889 | 6/1983 | Tichy | 417/487 |
| 4,622,001 | 11/1986 | Bright et al. | 425/549 |
| 4,653,995 | 3/1987 | Ward | 425/567 |
| 4,666,396 | 5/1987 | Shaw | 425/549 |
| 4,882,469 | 11/1989 | Trakas | 425/549 |

FOREIGN PATENT DOCUMENTS

| | | | |
|---|---|---|---|
| 1-159221 | 6/1989 | Japan | 425/549 |

*Primary Examiner*—Tim Heitbrink
*Attorney, Agent, or Firm*—Herbert W. Larson

[57] ABSTRACT

The sprue bushing is mounted within a support housing for an injection molding machine. Melt viscosity of plastic employed is controlled by moving water through the bushing inner tube during the presence of the plastic. The bushing has an outer sleeve containing a longitudinal central bore. An inner tube is mounted within the bore, but spaced apart from an inner wall of the bore. Baffles mounted on opposite sides of an outer wall of the inner tube prevent water movement around an upper portion of the tube. A lower portion of the tube having a smaller outer diameter than the upper portion permits the water to flow under the baffles and through the bushing.

15 Claims, 5 Drawing Sheets

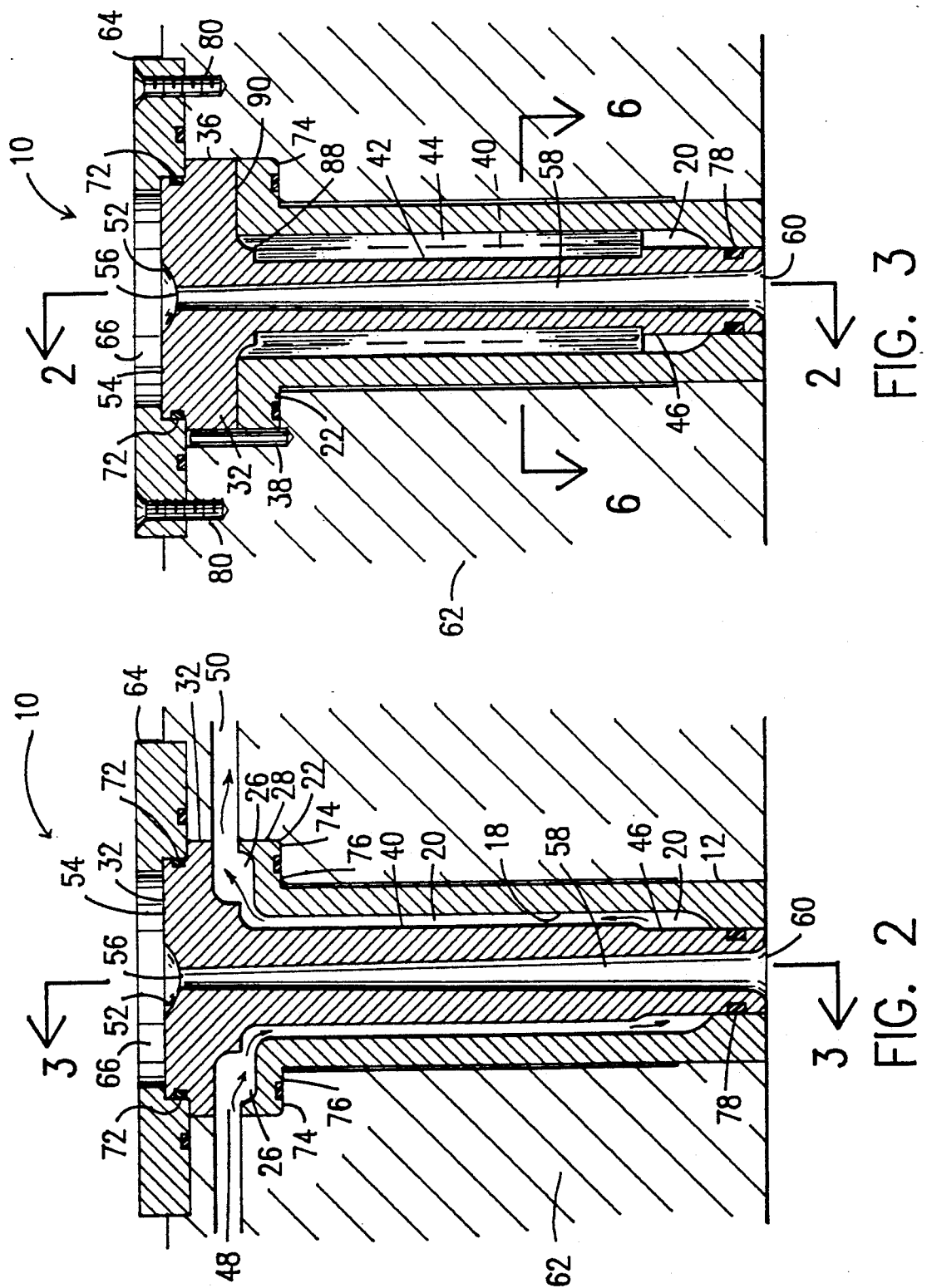

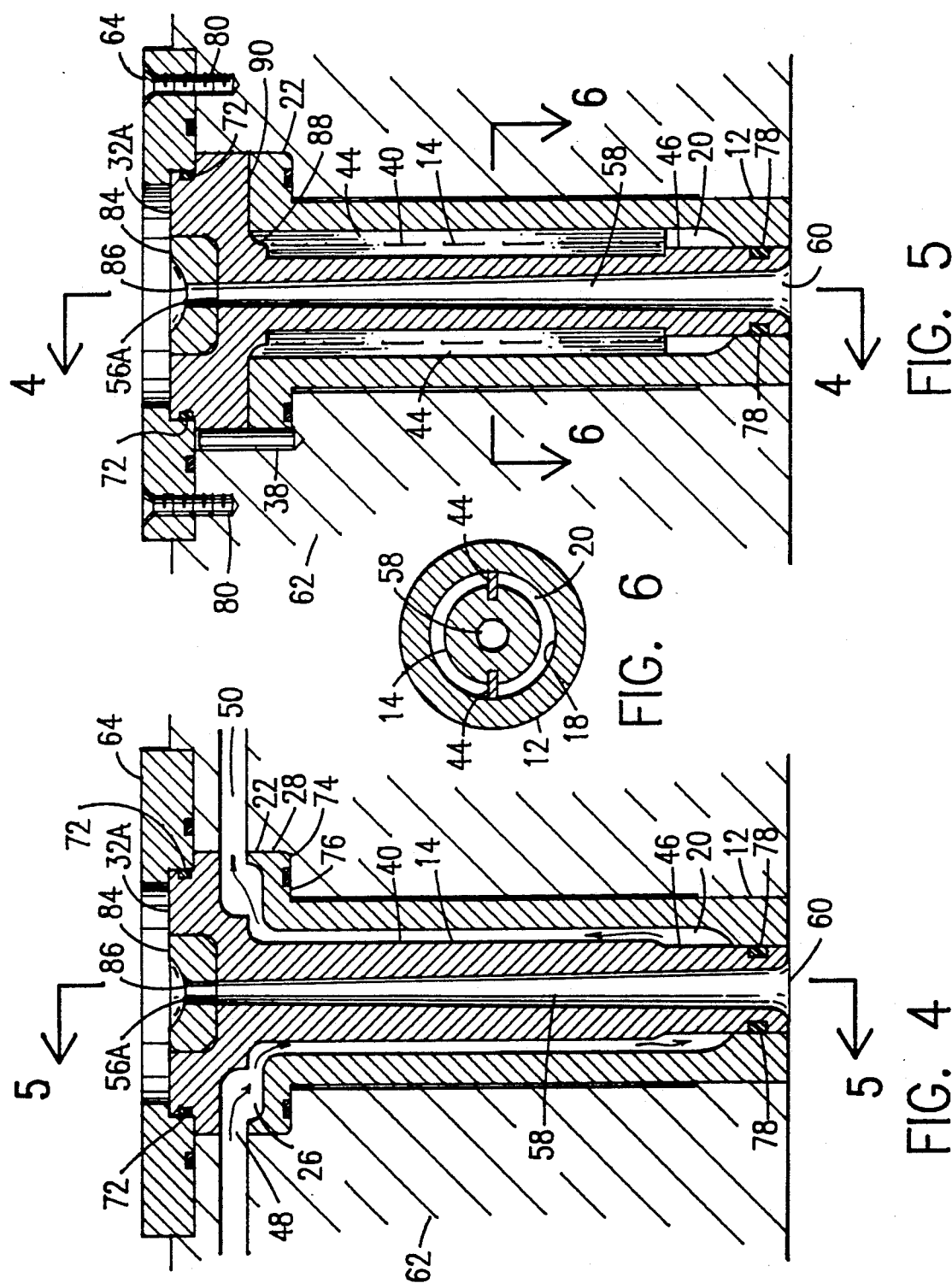

WATER JACKETED SPRUE BUSHING

BACKGROUND OF THE INVENTION

1. Field of The Invention

This invention relates to sprue bushings. More particularly, it refers to sprue bushings having a water jacket for controlling the melt viscosity of molten plastic moving through the bushing.

2. Description of The Prior Art

Sprue bushings are commonly used in the injection molding of plastic materials to convey the molten plastic from the injection molding machine to the cavities of the mold. Different apparatus and methods have been employed in the prior art to control the melt viscosity of the molten plastic to insure an adequate supply to the cavities without undue extending sprue. U.S. Pat. No. 4,260,348 describes a sprue bushing having longitudinal grooves to form channels for inlet and outlet water to control the temperature of the molten plastic at about 170° F. U.S. Pat. No. 4,004,871 describes an apparatus having a water supply conduit to a mold gate insert assembly to maintain the particular plastic material employed at the proper setting temperature.

Although these prior art apparatus and methods control melt viscosity to some degree, a sprue bushing is needed that can be easily installed and employed to control melt viscosity of a wide variety of different plastics

SUMMARY OF THE INVENTION

I have invented a sprue bushing that is simple to use, can be easily installed and achieves the object of controlling melt viscosities on a wide range of different plastics.

My sprue bushing contains an elongated cylindrical outer sleeve having a longitudinal central bore and an annular collar overhanging a top edge of the sleeve. An elongated cylindrical inner tube is mounted within the outer sleeve bore, with an outer wall of the inner tube spaced apart from an inner wall of the sleeve. The inner tube has an annular cap with a longitudinal central bore and drilled channels on opposite sides of the cap perpendicular to the tube to provide a water route into the space between the inner tube and inner wall of the outer sleeve bore. A pair of baffles inserted into a slot on each side of the inner tube prevents water from moving around an upper portion of the tube. A lower portion of the tube has a narrower outer diameter and permits water to move through the sprue bushing.

The sprue bushing contains 0-rings to prevent leakage of water and has a top locating ring suitable for mounting the sprue bushing within a support housing.

BRIEF DESCRIPTION OF THE DRAWINGS

The invention may be best understood by those having ordinary skill in the art by reference to the following detailed description when considered in conjunction with the accompanying drawings in which:

FIG. 2 is a longitudinal section view of the sprue bushing along lines 2—2 of FIG. 3.

FIG. 3 is a longitudinal section view of the sprue bushing along lines 3—3 of FIG. 2.

FIG. 4 is a longitudinal section view of the sprue bushing together with an upper insert, along lines 4—4 of FIG. 5.

FIG. 5 is a longitudinal section view of the sprue bushing together with an upper insert, along lines 5—5 of FIG. 4.

FIG. 6 is a latitudinal cross-section view of the sprue bushing along lines 6—6 of FIG. 5.

DETAILED DESCRIPTION OF THE INVENTION

Figure 1:
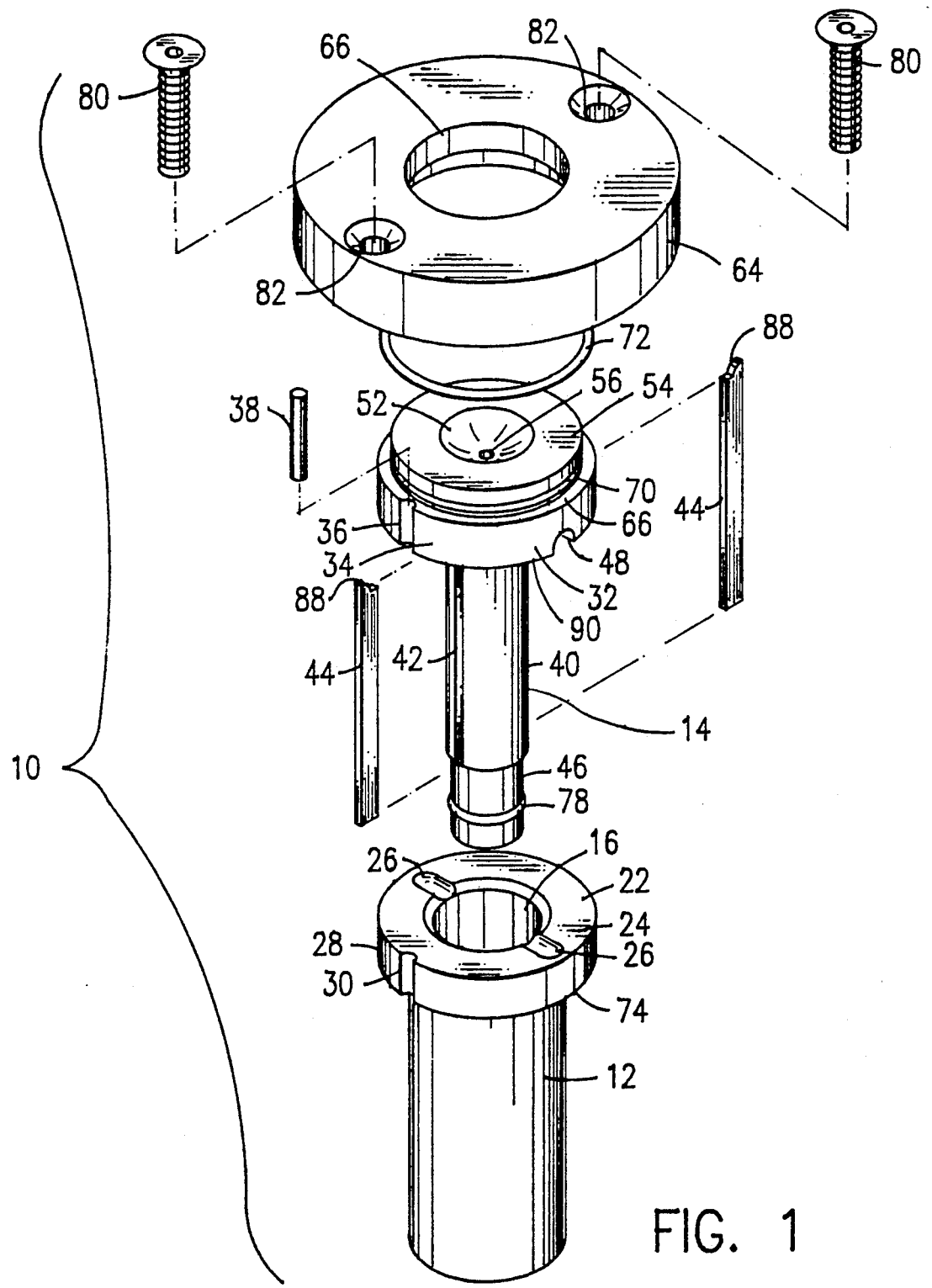
FIG. 1 is an exploded view of the component parts of the water jacketed sprue bushing of this invention.

Throughout the following detailed description the same reference numerals refer to the same elements in all figures.

The sprue bushing 10 as shown in FIG. 1 has two major elements. First, an outer sleeve 12 and secondly, an inner tube 14. In operation of the sprue bushing, the inner tube 14 is inserted within bore 16 of the outer sleeve 12 and is spaced apart from the inner wall 18 of bore 16. The space between the inner tube 14 and the wall 18 provides a channel 20 for movement of water.

A collar 22 is integral with and mounted axially over the top of the cylindrical portion of the outer sleeve 12. The top surface 24 of the collar 22 has a pair of oppositely positioned troughs 26. A side edge 28 of the collar 22 has a locking pin groove 30.

The inner tube 14 has an integral cap 32 axially mounted over a top of the tube. The cap has a side surface 34 containing a locking pin groove 36 aligned with the locking pin groove 30 in the outer sleeve when the inner tube is locked in placed within the outer sleeve 12. During engagement of sleeve 12 and tube 14, a locking pin 38 is inserted into grooves 30 and 36 to insure proper alignment and locking of the sleeve 12 and tube 14. Channel 48 in the cap 32 fits over trough 26 when the sleeve 12 and tube 14 are locked together.

The inner tube 14 has an upper longitudinal extended portion 40 with a slot 42 on each side. A pair of baffle plates 44 fit into the slot 42 on each side of tube 14. A lower portion 46 of tube 14 has an outside diameter less than the outside diameter of portion 40. When the inner tube 14 is inserted into bore 16 the baffle plates 44 abut the inner wall 18 of bore 16. Water flows into the bushing 10 at opening 48 and flows through channel 20 under the baffle plates 44, around the lower portion 46 of tube 14 and out through opening 50. Openings 48 and 50 are formed when the cap 32 is locked in place over collar 22.

A depressed dish shaped portion 52 on a top surface 54 of cap 32 has a central bore opening 56 leading to a channel 58 for directing the flow of the plastic material downward and out through bottom opening 60 to a mold (not shown).

The sprue bushing is generally mounted within a support housing 62 as shown in FIGS. 2-5. A locating ring 64 having a central hole 66 is mounted over cap 32 so that the locating ring 64 sits on shelf 68 of cap 32. A shallow groove 70 receives an 0-ring 72 so that a tight seal is formed between the locating ring 64 and cap 32. The bottom edge 74 of collar 22 is seated on a ledge 76 in the support housing 62.

An O-ring 78 is mounted in the bottom portion 46 of tube 14 to prevent leakage of water from channel 20. After inner tube 14 is inserted into outer sleeve 12 with the baffle plates 44 and locking pin 38 in place, locking screws 80 are screwed into holes 82 and into support housing 62 to firmly position the sprue bushing 10.

Figure 7:
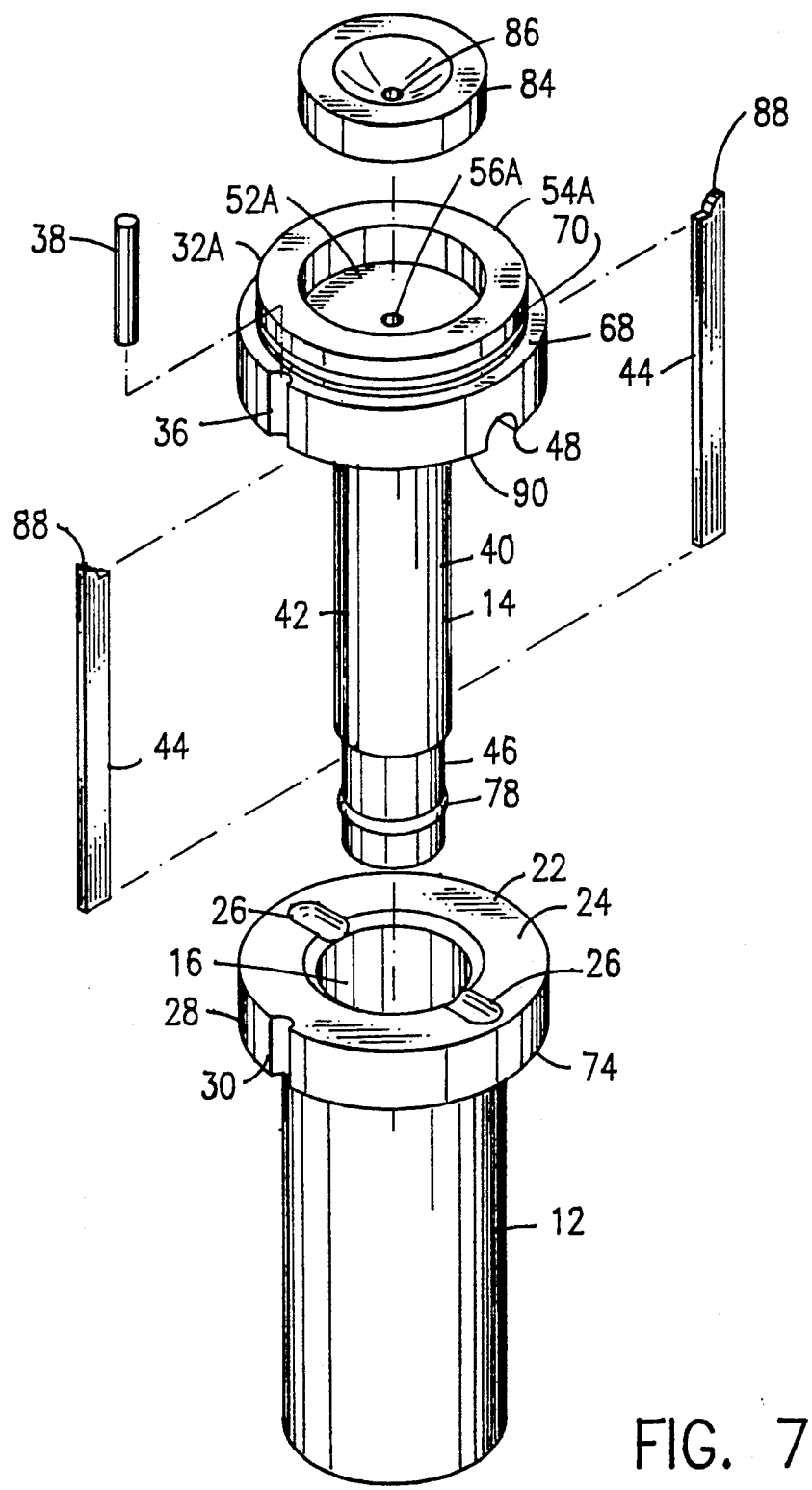
FIG. 7 is an exploded view of the sprue bushing together with a hardened metal upper insert.

As seen in FIGS. 4, 5 and 7 a separate upper insert 84 can be inserted into a modified cap 32A to provide a harder metal surface for receiving higher temperature plastics. The modified cap 32A has a narrower top surface 54A, a bore opening 56A and a dish receptor 52A for the insert 84. A bore 86 in the upper insert 84 is aligned with bore opening 56A in the cap 32A. The inner tube 14 in FIGS. 4 and 5 is made from an alloy called "AMPCO" 945 or 940, an alloy of copper, nickel, silicon and chromium made by Performance Alloys & Services, Inc., Waukesha, Wis., so that heat is rapidly transferred.

The baffles 44, as shown in FIGS. 3 and 5 each have a top notch 88 that fits into a corresponding notch in the bottom surface 90 of cap 32 to maintain the baffles 44 in a fixed position.

During normal operating conditions water pressure of about ninety pounds per square inch runs through the sprue bushing to maintain temperature of the plastic within channel 58 at any desired temperature. Close control of the plastic temperature ensures complete filling of the mold and a diminished amount of wasted sprue.

The sprue bushing parts are made of stainless steel or other metal tooling material. The upper insert 84 is made of hardened 420 stainless steel.

Figure 8:
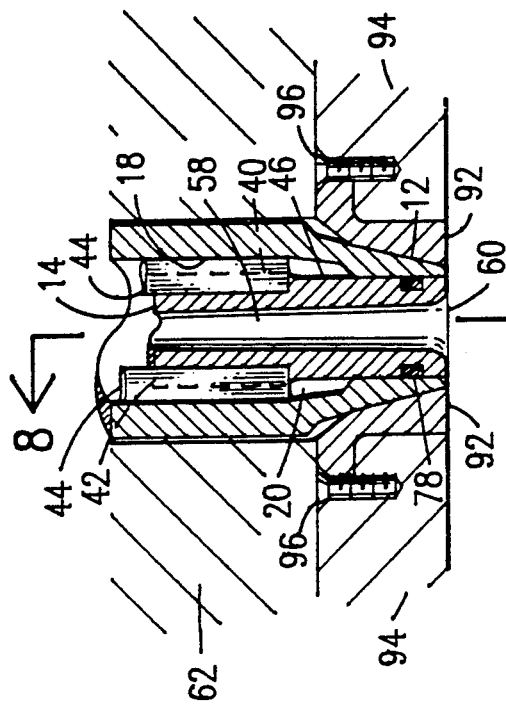
FIG. 8 is a section view in elevation depicting an alternate tip of the sprue bushing along line 8—8 of FIG. 9.
Figure 9:
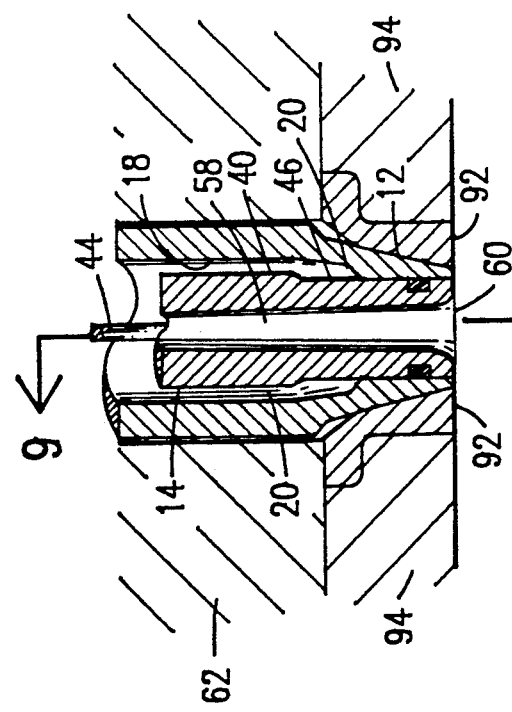
FIG. 9 is a section view through line 9—9 of FIG. 8.

In FIGS. 8 and 9 an alternative lower portion of outer sleeve 12A is cone shaped to fit snugly into bushing ring 92 mounted within housing 94 by a pair of screws 96.

Figure 10:
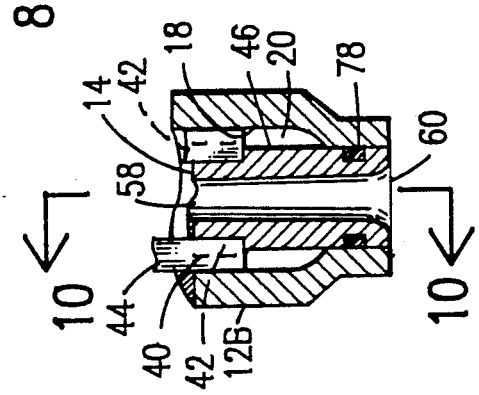
FIG. 10 is a section view in elevation depicting another alternate tip of the sprue bushing alone line 10—10 of FIG. 11.
Figure 11:
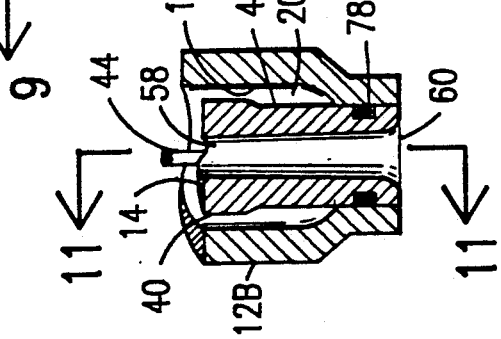
FIG. 11 is a section view through line 11—11 of FIG. 10.

In FIGS. 10 and 11 another alternative lower portion of outer sleeve 12B is tapered to fit into a bushing ring to provide modified tips of greater metal hardness.

Alternative materials and shapes for the component parts described herein can be substituted without departing from the invention described and claimed.

Having thus described the invention, what is claimed and desired to be secured by Letters Patent is:

1. A sprue bushing for use in an injection molding machine for controlling a melt viscosity of a plastic employed, the bushing comprising
    an elongated cylindrical outer sleeve having a longitudinal central bore with an integral annular collar overhanging a top edge of the cylindrical outer sleeve, a top surface of the collar containing oppositely placed troughs,
    an elongated cylindrical inner tube having a longitudinal central bore for directing a flow of the plastic, an integral annular cap axially mounted over a top end of the tube, the tube having an upper portion with a longitudinal slot on opposite sides and a lower portion having a lessor exterior diameter than the upper portion, the tube being mounted within the outer sleeve bore, spaced apart from an inner wall of the bore,
    the cap having a longitudinally extending central bore aligned with the inner tube bore, the cap further having a pair of channels from an outer surface to an interior portion, each channel being on opposite sides of the cap and each aligned with one of the troughs on the outer sleeve collar when the inner tube is mounted within the bore of the outer sleeve,
    a baffle plate mounted within each longitudinal slot in the inner tube with an outer edge of each baffle plate abutting the inner wall of the outer sleeve bore,
    a means for mounting the sprue bushing within a support housing and,
    a means for ensuring flow of water within the bushing without leakage.

2. The sprue bushing according to claim 1 wherein a locking pin positioned within a groove on an outer side surface of the cap and a groove on an outer side surface of the collar maintains alignment of the inner tube and outer sleeve when the inner tube and outer sleeve are locked in place within the support housing.

3. The sprue bushing according to claim 1 wherein each baffle plate has a notch on a top end to engage a corresponding notch on a bottom surface of the cap.

4. The sprue bushing according to claim 1 wherein the means for mounting the sprue bushing within the support housing is a locating ring having a central hole axially aligned with a top surface of the cap, the locating ring having multiple acentric holes on a top surface for receiving screws for engagement with the support housing and a bottom surface of the outer sleeve collar resting on a shelf within the support housing.

5. The sprue bushing according to claim 1 wherein the means for ensuring flow of water within the bushing without leakage is an O-ring placed around the lower portion of the inner tube.

6. The sprue bushing according to claim 1 wherein the baffle plates, inner tube and outer sleeve are made from a metal.

7. The sprue bushing according to claim 4 wherein an upper insert made from a hardened steel is positioned within the central hole of the locating ring and the cap has annular upper side edges forming a cup to receive the upper insert.

8. A sprue bushing for use in an injection molding machine for controlling a melt viscosity of a plastic employed, the bushing comprising
    an elongated metal outer cylindrical sleeve having a longitudinal central bore with an annular collar axially aligned with the sleeve and integral with a top edge of the sleeve, a top surface of the collar containing oppositely placed troughs,
    an elongated cylindrical tube having a narrower outside diameter than a diameter of the central bore of the sleeve, the tube having a longitudinal central bore for directing a flow of the plastic, an annular cap axially aligned with the tube and integral with a top edge of the tube, the cap having a central longitudinal bore aligned with the central bore of the tube, the cap also having a pair of semi-circular holes on opposed exterior sides leading to an interior portion of the cap in a direction perpendicular to the longitudinal central bore, the semi-circular holes being aligned with the troughs in the collar when the tube is positioned within the outer sleeve bore,
    the tube having an upper portion of greater diameter than a lower portion, a longitudinal slot on opposed sides of the upper portion retaining a baffle plate which abuts an inner wall of the outer sleeve when the tube is positioned within the outer sleeve bore, a locating ring having a central hole mounted over the cap, the locating ring associated with means for permanently mounting the sprue bushing within a support housing and, means for sealing the bushing.

9. The sprue bushing according to claim 8 wherein a locking pin positioned within a groove on an outer side surface of the cap and a groove on an outer side surface of the collar maintains alignment of the inner tube and outer sleeve within the support housing.

10. The sprue bushing according to claim 8 wherein a channel is formed between the inner wall of the sleeve and an outer wall of the tube to permit water to flow around the tube.

11. The sprue bushing according to claim 8 wherein each baffle plate has a notch on a top end to engage a corresponding notch on a bottom surface of the cap.

12. The sprue bushing according to claim 8 wherein a shelf in the support housing engages a bottom surface of the outer sleeve collar to support the sprue bushing in the housing.

13. The sprue bushing according to claim 8 wherein the locating ring has multiple acentric holes for receiving attachment means to engage the support housing.

14. The sprue bushing according to claim 10 wherein an O-ring on the lower portion of the tube seals the bushing and prevents water leakage from the channel formed between the sleeve and tube.

15. A sprue bushing according to claim 8 wherein the outer cylindrical sleeve has a tapered lower end which is snugly fit into a bushing ring mounted within an additional housing.

* * * * *